June 24, 1941.  E. R. REHM  2,246,814
HYDRAULIC BRAKE CONTROL SYSTEM
Filed Dec. 16, 1938  2 Sheets-Sheet 2
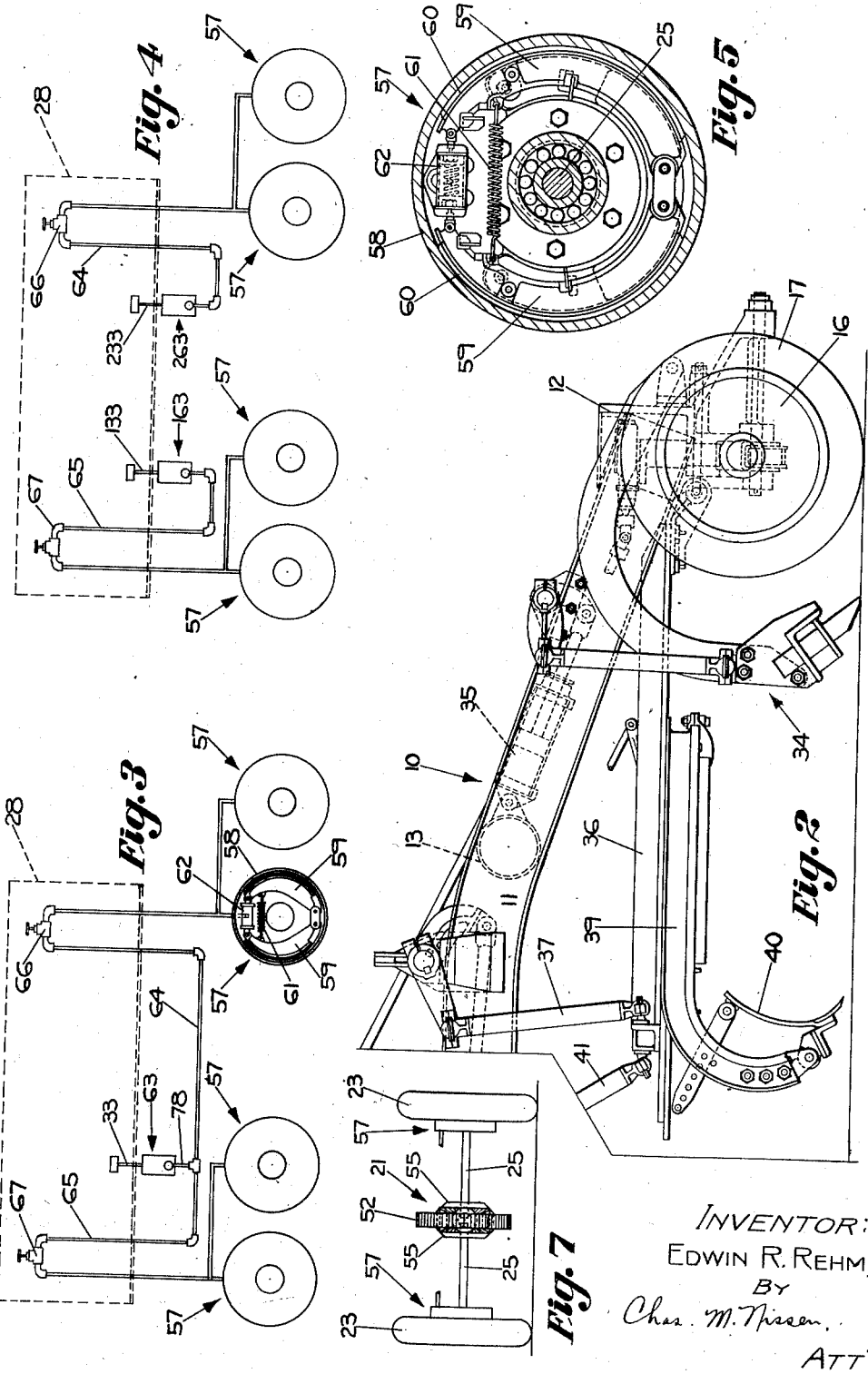
INVENTOR:
EDWIN R. REHM,
By
Chas. M. Nissen.
ATT'Y.

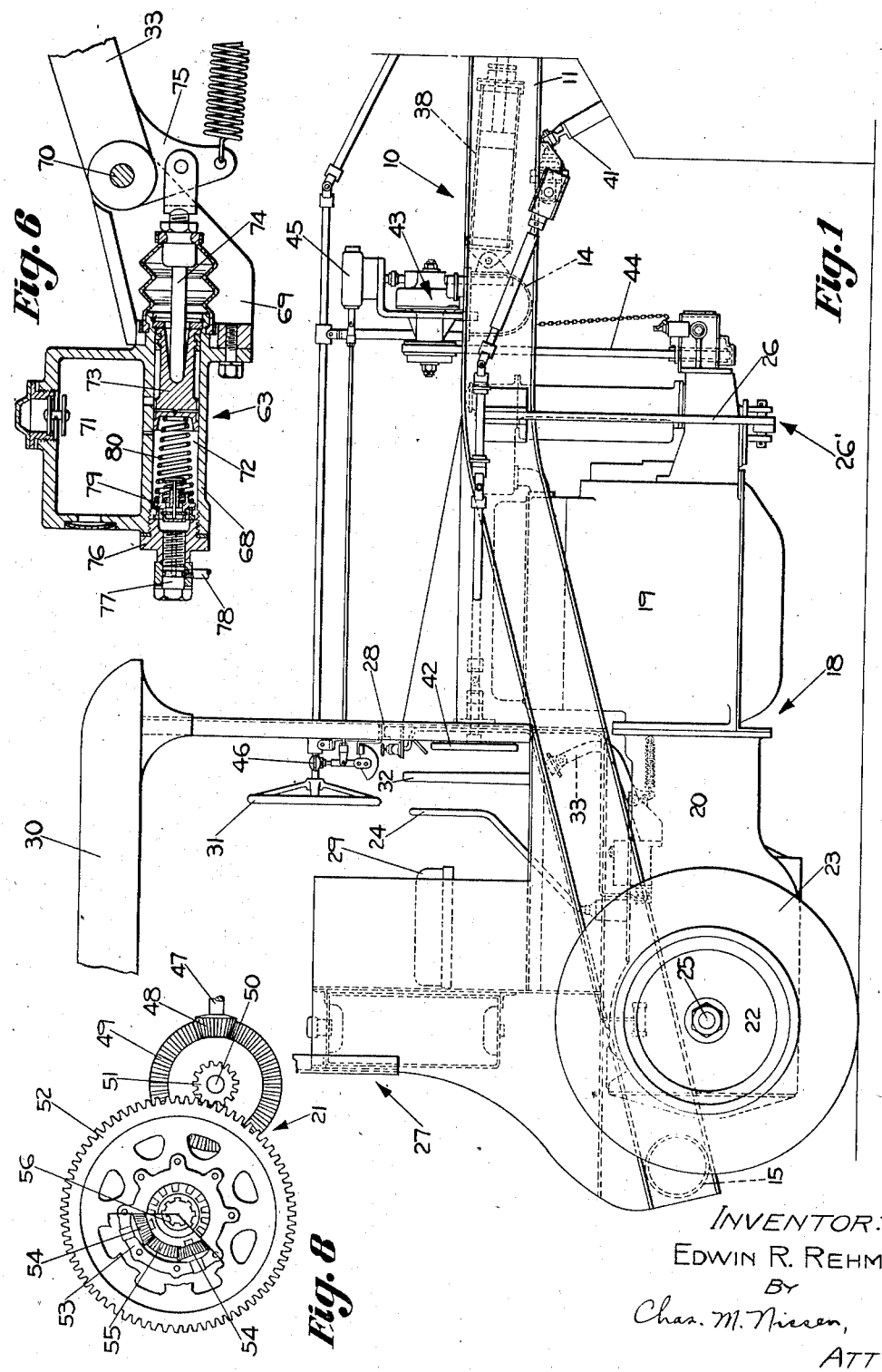

Patented June 24, 1941

2,246,814

UNITED STATES PATENT OFFICE 2,246,814

HYDRAULIC BRAKE CONTROL SYSTEM

Edwin R. Rehm, Galion, Ohio, assignor to The Galion Iron Works & Manufacturing Company, a corporation of Ohio Application December 16, 1938, Serial No. 246,100

1 Claim. (Cl. 188—152)

This invention relates to a hydraulic brake control system and particularly to a motor driven vehicle which is provided with an improved type of hydraulic brake control system.

An object of the invention is to provide a power operated vehicle with a hydraulic brake control system which may be operative to prevent slipping of one of the drive wheels thereof when driven through a differential mechanism.

Another object of the invention is to provide a road grader, having a tandem four-wheel drive which is driven from a motor through a differential, with brake mechanism to prevent the grader being stalled when doing heavy duty work on the road where the traction of one set of tandem wheels is poor.

A further object of the invention is to provide an improved form of hydraulic brake control system which may be used on any type of power driven vehicle.

Other objects of the invention will appear hereinafter, the novel features and combinations being set forth in the appended claim.

In the accompanying drawings,

Figs. 1 and 2 combine to make a side elevational view of a road grader incorporating the features of my invention;

Fig. 3 is a diagrammatic illustration of the improved hydraulic brake control system of my invention;

Fig. 4 is a modified form of hydraulic control system;

Fig. 5 is a sectional elevational view showing in detail a hydraulically operated brake which may be employed with the vehicle of my invention;

Fig. 6 is a sectional elevational view of a master cylinder which may be employed in the hydraulic brake control system;

Fig. 7 is a diagrammatic end view illustrating the drive from the motor to the traction wheels including the differential; and Fig. 8 is a detail elevational view showing the differential drive for the traction wheels.

As is well known, it is a preferred practice to drive the traction wheels of a motor driven vehicle, such as an automobile, truck, tractor, road grader, or any similar device, from the motor or power plant through a differential to the end that the vehicle may be readily turned or travel around a curve without damage to the tires, the differential, of course, permitting relative rotation between the two traction wheels or two sets of traction devices.

It is also well known that these differentials have certain disadvantages in that if one traction wheel gets into a ditch or is on a slippery surface where insufficient traction is afforded between the tires or ground engaging portion of the traction means and the ground the wheel will slip and all the power from the motor will be delivered to the slipping wheel resulting in the vehicle becoming stalled. This problem is particularly acute with heavy vehicles, such as tractors, trucks and road graders.

To overcome this objection some such heavy vehicles are provided without any differential, or in other words, the driving wheels on opposite sides of the vehicles are rigidly connected together by a stiff axle. This practice has certain definite disadvantages because in the first place it restricts appreciably the turning radius of the vehicle. The disadvantage is particularly acute where the driving wheels of the vehicle are of the tandem type, that is, there are two driving wheels on each side of the vehicle placed in tandem and geared or chained to rotate together, because these four driving wheels present a box of rigid four-point construction insofar as any swinging or turning of the vehicle is concerned. This makes steering and turning very difficult and reduces very appreciably the turning radius of the vehicle. These four wheel tandem drives are commonly employed with road grading machines as well as with trucks and tractors due to the heavy work that they must perform.

In motor graders, increased traction as compared with the differential drive may be obtained by the use of the stiff or rigid axle construction together with additional ground engaging traction wheels, but such box construction makes straightaway steering and turning much more difficult on account of the lateral skidding of the traction wheels on one side or the other of such box construction. Moreover, even ordinary road surfaces caused rapid wear of the tires with such an arrangement and when turns are made on rough roads or on ragged stone, shale or cinders the tires were subject to serious injury by reason of such lateral skidding. By the use of my improvements increased traction is secured, the tire wear is reduced, steering is made much easier and the turning radius of the motor grader is greatly reduced, in some instances, by at least as much as fifteen feet, such lateral skidding being avoided particularly when the traction wheels are in tandem formation.

By virtue of the features of my invention the rigid axle construction has been entirely eliminated and the drive of the rear wheels, whether of the single or tandem type, is effected through a differential, yet a very simple and efficient means, preferably of the hydraulic type, is provided to prevent the vehicle becoming stalled or stuck due to the slipping of one of the drive wheels or one set of tandem drive wheels, for example as caused when said wheel or wheels is in a muddy ditch or on a slippery surface.

Referring to the accompanying drawings, it will be seen that the vehicle illustrated is a road grader, though in its broadest aspects it is to be understod that the invention may be applied to other types of motor driven vehicles including automobiles, trucks and tractors.

The grader comprises a main frame 10 of well known construction which may comprise a pair of longitudinally extending upwardly arched channels 11 rigidly connected together at their forward ends by transverse casting 12 and rigidly attached at a plurality of intermediate positions by cross-pieces 13 and 14 and at their rear ends by cross-piece 15. The front end of the main frame 10 is supported by front wheels 16 preferably provided with pneumatic tires 17, said front wheels 16 being, of course, the steering wheels for the complete vehicle.

At the rear end of the main frame 10 there is provided a tractor or power traction device 18 which includes a motor 19 the housing of which is rigidly attached to the housing 20 of the transmission and differential, the latter of which is seen in Figs. 7 and 8 at 21.

Supporting the rear end of the main frame 10 and the rear end of the tractor 18 are rear traction wheels 22 preferably provided with pneumatic tires 23. It is to be understood that the traction wheels 22 are driven from the motor 19 through transmission gearing, controlled by a lever 24, and differential 21 which drives the rear drive shafts 25 which, of course, provides for differential movement of the two traction wheels 22 which is particularly desirable when the vehicle is travelling around a curve.

In Fig. 1 of the drawings, I have illustrated a single drive wheel 22 on each side of the vehicle. It is to be understood, however, that any other well known drive wheel arrangement may be employed such as a dual drive which is, in effect, two wheels, both carrying pneumatic tires on the same axle, a tandem drive which is two wheels, one behind the other, connected to drive together as by chain and sprocket drive means, and both driven from a shaft, such as shaft 25, or dual tandem drive which is a combination of the dual and tandem in which case there are four driving wheels with four tires on each side of the vehicle.

All of these types of drives are well known in this art, particularly in connection with motor driven road graders and therefore have not been illustrated in detail in the drawings. It is to be noted, however, that in Figs. 3 and 4 of the drawings I have illustrated diagrammatically a tandem drive arrangement on opposite sides of the vehicle.

The front end of the tractor 18 is pivotally supported at 26' from the main frame 10 by a U-shaped yoke 26 and the frame channels 11 are attached to the housing of shafts 25 whereby the tractor or power traction device 18 is attached to the rear end of the main frame 10 to form the complete grader. It is, of course, understood that this particular arrangement of parts is purely one illustrative embodiment of my invention and that any other form of driving mechanism may be provided so long as the motor drives the traction wheels or other traction devices through a differential.

At the rear end of the tractor 18 is an operator's cab 27 providing a dash board 28, seat 29 and top 30. This, of course, provides an operator's station at which the aforementioned transmission lever 24 is located, there also being located at this operator's station a steering wheel 31 for controlling the front wheels 16 to steer the vehicle, a hand brake lever 32, a foot brake lever 33, and a number of other control mechanisms for the vehicle, some of which are hereinafter described in more detail.

Carried on the main frame 10 is a scarifier 34 which may be adjusted by an operating mechanism including a double acting hydraulic piston motor 35. Also carried by the main frame 10 is a drawbar 36 which is of standard well known construction, the front end of which is pivotally attached to the casting 12 and the rear end of which is supported on opposite sides of the main frame 10 by adjustable hang rod mechanism 37 which may be adjusted by a double acting hydraulic piston motor 38. The drawbar 36 carries the usual adjustable circle 39 to which is adjustably attached a moldboard 40. Also connected to the rear end of the drawbar 36 is a laterally shifting mechanism 41 which is operable from the operator's station by a train of operating mechanism including handle 42.

To provide for the adjustment of the hydraulic piston motors 35 and 38 the grader is also provided with a hydraulic control system of well known construction which includes a pump 43 driven from the motor 19 by a V-belt drive 44, which pump feeds a plurality of control valves contained in a manifold 45, which control valves are controlled by individual operating levers adjacent the operator's station or position, one of which is seen at 46.

For a more complete disclosure of the hydraulic control system for the scarifier and moldboard reference is made to the patent to F. O. DeMillar, No. 2,057,089, dated October 13, 1936, for a Hydraulic road grader.

As was above pointed out, the power drive from the motor 19 to the traction wheels 22 is through the differential 21 which provides in a well known manner for differential or relative movement of the two wheels 22 on opposite sides of the vehicle. In other words, the two drive shafts or axles 25, illustrated particularly in Fig. 7 of the drawings, may rotate together or in unison, or there may be differential rotation between them. Furthermore, as above pointed out, the axles 25, instead of driving wheels 22 directly, may drive sprockets which, in turn, drive tandem wheels through any appropriate drive means such as chain and sprocket means carried by the shafts of the tandem wheels. In any event, the traction wheels on one side of the vehicle may have a differential action with respect to the traction wheels on the other side of the vehicle by virtue of the differential 21.

In Fig. 8 of the drawings, there is shown in detail a form of differential which may be employed. As here illustrated, the differential comprises a drive shaft 47 provided with a bevel pinion 48 meshing with a bevel ring gear 49 keyed to a shaft 50 to which is also keyed a pinion 51. Pinion 51 meshes with a bull gear 52 to which is rigidly attached a differential housing 53 in which are journalled a plurality of differential gears 54 which mesh on opposite sides with a pair of ring gears 55, 55 mounted for free rotation in the housing 53. At their centers the gears 55, 55 are splined or keyed, as illustrated at 56, to respectively receive the ends of shafts 25 which may be of the floating type.

As is well understood, whenever the bull gear 52 is rotated, the differential 21 will tend to drive the two shafts 25 and will equalize the torque on them. In case the traction means driven by one of said shafts 25 tends to slip the differential 21 will act to transfer all of the rotation of the bull gear 52 to this shaft 25 connected to the slipping traction wheel. This has a very desirable characteristic in driving the vehicle around curves, but a very undesirable characteristic in case the vehicle tends to become stalled due to lack of traction on one of the traction wheels, or a plurality of traction wheels if more than one is driven by a single shaft 25. This problem is particularly acute with motor graders in which there is an earth working tool such as the scarifier 34 or moldboard 40 which is working on a road surface because an appreciable amount of traction is necessary to move such a motor grader while performing an earth working operation.

In order to realize the full advantages incident to the employment of a differential and yet to overcome the disadvantages thereof, I have provided a simple but novel improved braking system which finds extremely simple embodiment in a hydraulic type of brake control system, now to be described. It is to be understood, however, that in its broadest aspects, the advantages may be derived from other braking systems than the hydraulic type.

Referring first to Fig. 5 of the drawings, there is seen a brake mechanism 57 associated with one of the traction wheels 22, comprising a brake drum 58 which is rigidly attached to the wheel 22. Cooperating with the brake drum 58 is a pair of pivotally connected brake shoes 59 each provided with friction brake lining 60 which brake shoes 59 are biased to brake releasing position by a spring 61 and adapted to be urged to brake applying position by a hydraulic brake actuating or piston motor 62 adapted to be supplied with hydraulic fluid under pressure, as hereinafter described in more detail.

It will, of course, be understood that where there are only two driving wheels 22 there will be a brake mechanism 57 associated with each of them. In case the tandem drive is employed there is preferably a braking mechanism 57 associated with each of the four traction wheels. If a dual tandem drive is employed there is preferably one brake mechanism 57 associated with each pair of dual wheels, making a total of four. If desired, however, in the case of the tandem drive, either single tandem or dual tandem, only one brake mechanism 57 need be employed with one of the wheels on each side of the vehicle. In this case, at least one wheel on each side of the vehicle will then have a braking mechanism associated with it. In lieu of this latter arrangement, in case a tandem drive is provided, a brake mechanism 57 may be associated directly with each of the shafts 25 in which case there will be one brake mechanism 57 on each side of the vehicle.

Referring first to Fig. 3 of the drawings, for a description of the hydraulic brake control system, it is to be seen that the foot brake lever 33 controls a master cylinder 63, the structure of which is illustrated in detail in Fig. 6 of the drawings. It may be stated generally that whenever manually operable foot brake lever 33 is actuated, the master cylinder 63 supplies hydraulic fluid under pressure to conduits 64 and 65, the former of which leads to a pair of hydraulic brake mechanisms 57 at one side of the vehicle, and the latter of which leads to a pair of hydraulic brake mechanisms 57 at the other side of the vehicle. It is, of course, evident that if the traction drive is by a single or duplex drive on each side, conduits 64 and 65 will each lead to a single brake mechanism 57.

In each of the conduits 64 and 65 I provide a manually operable control valve, that in conduit 64 being seen at 66, and that in conduit 65 being seen at 67. During the normal operation of the vehicle, valves 66 and 67 will be in conduit opening position and as a consequence, whenever foot brake lever 33 is actuated, all the brake mechanisms 57 will operate to stop the vehicle in the usual manner. However, in case one of the drive wheels 22, or one set of drive wheels in case of the tandem driving, starts slipping so that the vehicle is not propelled due to the differential action, as above described, this slipping action of one of the drive wheels or sets of drive wheels at one side of the vehicle, is overcome by closing the hand valve of the drive wheel which is on a firm foundation, or in other words, has good traction. When this is done the operation of the foot lever 33 will effect only the brake mechanism 57 associated with the slipping wheel or wheels.

For example, let it be assumed that the two driving wheels with which the brake mechanisms 57, illustrated at the right of Fig. 3, are slipping, due to the fact that the tires associated with these wheels are in a mudhole or on ice and as a consequence the vehicle is stuck because all of the power of the motor is diverted by the differential to these wheels which present a lower resistance to movement. The operator, under such conditions, will close valve 67 and depress the foot brake lever 33 while the motor is operating. This action will, of course, result in operation of the brakes 57 at the right of Fig. 3, and will increase the torque on the drive shaft 25 associated with these slipping wheels until that torque is sufficient to cause rotation of the traction wheels associated with the other drive shaft 25. In other words, the brake mechanism is applied only to the wheel which is slipping and the friction of this brake mechanism compensates for the lack of friction presented by the slippery surface upon which the tires are sliding.

It is, of course, evident that from a fundamental standpoint any differential braking action may be applied whenever one wheel tends to slip, which is sufficient to compensate for the lack of traction on the slipping tire or tires. Therefore, so long as there is a proper differential between the braking action on the driving means on opposite sides of the differential 21 the above described operation can be effected. As a consequence, it is not essential that there be no braking action whatever on the axle which drives the tires having a firm footing, though of course, such a braking action on this wheel or tire is without particular significance to prevent the vehicle becoming stuck. Conversely, if the wheels to the left of Fig. 3 slip this is overcome by closing the valve 66 with the valve 67, of course, in open position.

As illustrated in Fig. 3 of the drawings, each of the conduits 64 and 65 is preferably provided with a control valve such as the valves 66 and 67. This is not entirely necessary in a right-handed machine or in a left-handed machine and in practice only one of the conduits 64 or 65 may be provided with a manually controlled valve. For example, it is common to operate most vehicles on the right hand side of the road and therefore usually it is a right hand traction tire or tires which get off of the good surface onto a slippery surface. Therefore, from a practical standpoint, only one hand valve, such as the valve 67 associated with the lefthand traction mechanism of a right-hand machine, need be supplied, for by its operation alone the brakes may be selectively operated in the customary manner, or may be operated to prevent the vehicle becoming stuck due to lack of traction on the right hand traction wheels or tires. It is preferred, however, that both valves 66 and 67 be employed particularly with a road grader or other vehicle which is doing heavy duty work over roads which at times are very rough and crude in which either the right hand or the lefthand traction mechanism may encounter a slippery surface. The valves 66 and 67 may be mounted on the dash board 28 at the operator's station.

There is another feature provided by my improved hydraulic brake control system in that by the simple expedient of depressing the foot brake lever 33 to apply either one or both sets of brake mechanisms 57 and thereafter operating the valves 66 or 67, or both of them, the brake mechanisms 57 will be locked to act as a parking brake, it, of course, being evident that if each valve 66 and 67 is closed after the brake mechanisms 57 are actuated, the latter will be locked in their actuating or applied positions even though the operator removes his foot from lever 33.

Referring to Fig. 4 of the drawings, I have shown a modified form of control mechanism including two master cylinders 163 and 263, the former of which is individual to the conduit 65 and the latter of which is individual to the conduit 64. The master cylinders 163 and 263 are operated by foot brake levers 133 and 233, respectively. In the system of Fig. 4 it is, of course, evident that valves 66 and 67 need not be operated at all to effect the differential braking action on the traction devices on opposite sides of the vehicle. An operator, merely by using both feet, can operate the levers 133 and 233 either to effect a regular braking action on the vehicle, or a differential braking action to compensate for the lack of traction on the traction tires on either side of the vehicle as caused, for example, by wet or icy traction surfaces.

In the system of Fig. 4 the principal functions performed by the valves 66 and 67 is to lock the brake mechanisms individually in braking position for parking purposes.

Referring to Fig. 6 of the drawings, there is illustrated in detail a form of master cylinder 63 which may be employed, it being understood that the master cylinders 163 and 263 may also be of similar structure. Said master cylinder 63 comprises a casting 68 provided with a bracket 69 upon which is pivotally attached the foot brake lever 33 by pivot pin 70. Casting 68 is provided with a hydraulic reservoir 71 and at its bottom provides a cylindrical bore 72. Within the bore 72 is a slidable piston 73 operable by a push rod 74 pivotally attached to a crank arm 75 formed integral with the lever 33. The bore 72 is closed at one end by a head 76 provided with a drilled and grooved conduit forming screw 77 which leads to a conduit 78 which branches to the aforementioned conduits 64 and 65, as illustrated in Fig. 3 of the drawings. The head 76 is provided with a check valve 79 between which and the piston 73 extends a coil spring 80 urging the check valve 79 in seating position and urging the piston 73 to the right, as viewed in Fig. 6.

The check valve 79 is constructed to allow a relatively free flow of fluid from the bore 72 to the conduit 78 while permitting a reverse flow of fluid only in response to a relatively high hydraulic fluid pressure on the lefthand side thereof. This tends to keep the hydraulic system under slight pressure at all times but is not sufficient to keep the brake mechanisms 57 in actuated or applied position.

It is, of course, evident that whenever foot brake lever 33 is actuated hydraulic fluid under pressure which fills the bore 72 will be transmitted through conduits 64 and 65 under normal operations to actuate all of the brake mechanisms 57 and whenever said foot brake lever 33 is released, the brake mechanisms 57 will be effectively released causing the hydraulic fluid therein to flow back into the bore 72. In view of the fact that this portion of the hydraulic fluid control system is of standard well known construction, particularly in connection with control systems for automobiles, trucks and graders, no further description thereof is deemed necessary to a clear understanding of its operation.

To reiterate briefly, in the operation of my improved hydraulic brake control system it will be understood that during normal operation the control valves 66 and 67 of either of the control systems of Fig. 3 or Fig. 4 will be open. With the control system of Fig. 3 when the manually operable or foot operated lever 33 is actuated, all of the brake mechanisms 57 (of which there will be four in the usual tandem drive and two in the usual two-speed and duplex drives, though under certain conditions there will be only two even in the tandem drive) will be operated to apply a braking action to all of the traction wheels in the usual manner of operation of a hydraulic braking system.

In case the wheel or wheels on one side of the vehicle start to slip, which is permitted by virtue of the differential 21, and which may be caused by said wheel or wheels being on a slippery surface, or in a mudhole, the operator closes one of the manual valves 66, 67. In case it is the traction mechanism associated with the conduit 64 that is slipping, the valve 67 associated with the conduit 65 is closed, and thereafter upon the actuation of the brake lever 33, the slipping of the traction mechanism will be stopped and the power from the motor 19 will be employed to rotate the other traction mechanism which is on firm foundation. In case it is the other traction mechanism which is slipping, the same operation will be effected except, however, that valve 66 will be closed and valve 67 opened.

In case it is desired to park the vehicle with one or more of the traction wheels locked by the brake mechanism or mechanisms associated therewith, the pedal 33 is depressed to apply the brakes and the valve 66 or 67, or both of them is closed to effect the locking action. This is particularly useful in parking the vehicle on an incline and avoids the necessity of the additional usual parking brake mechanism.

While my improvements may have a general application to various types of self-propelled vehicles, they are particularly applicable to motor road graders on account of their long wheel bases and the very heavy duties which they are called upon to perform. When a traction wheel is mired or operating under unusually rough conditions, the operator may apply pressure to a brake foot pedal to whatever degree necessary to restore traction to such traction wheel. This is highly desirable in motor graders in which an unusual amount of traction is necessary particularly on very rough roads or over ground where a new road is being constructed, such ground often being very muddy and therefore so slippery as to afford poor traction. Motor graders are not only self-propelling for transportation but are called upon to do heavy work in operating an earth working tool such as the moldboard or scarifier or both, and this requires an unusual amount of traction at the motor driven ground engaging traction wheels traveling over rough, irregular, wet and slippery ground or roadways.

The independent braking of the ground engaging traction wheels at opposite sides of the rear end of the motor grader employing a differential drive, enables the operator from his station to any time restore traction to enable the moldboard or scarifier to continue to perform very heavy duties, while the operator from his station may also with facility always steer the machine and at any time make turns on short radii even when tandem driven traction wheels are used, without undue wear on the tires of the traction wheels. It will thus be seen that by means of my improvements increased traction is secured or maintained in difficult places without use of the stiff axle construction with its inherent disadvantages. That is to say, by avoiding the stiff axle construction and its disadvantages as to undue wear on the tires of the traction wheels when the motor grader is turned or steered on a relatively short radius over rough ground, and instead combining differentially driven ground engaging wheels with independent braking mechanism for the wheels on opposite sides of the grader, the operator is able to secure and maintain sufficient traction for the road grader to continue heavy duty work over rough and wet roadways while such flexibility of steering is maintained, even when the traction wheels are tandem driven, as to facilitate steering without undue wear on the tires of the traction wheels particularly when turning the machine on a relatively short radius over rough ground. Ease of steering a motor grader and maintenance of sufficient traction are highly desirable because the angularly positioned moldboard constantly tends to swerve the machine to that side where the front end of the moldboard is located.

Obviously those skilled in the art may make various changes in the details and arrangement of parts without departing from the spirit and scope of the invention as defined by the claim hereto appended, and I therefore wish not to be restricted to the precise construction herein disclosed.

Having thus described and shown an embodiment of my invention, what I desire to secure by Letters Patent of the United States is:

In a power driven vehicle, the combination with a vehicle frame, of a steering wheel unit therefor, a power traction unit connected to said frame and having ground engaging traction wheels, brake mechanisms one individual to each of said traction wheels, separate hydraulic means for operating each brake mechanism individually, each hydraulic means comprising a conduit connected between a foot operated hydraulic pressure device and its brake mechanism, and manually operable valves one in each conduit and within reach of the operator at his station, each valve being between its pressure device and its brake mechanism to effect locking of the latter in applied position, the construction and arrangement being such that the operator at his station can with his feet operate both or either of said hydraulic pressure devices and with his hands can operate both or either of said valves to effect the operation of both or either of said brake mechanisms and effect locking of both or either in applied positions.

EDWIN R. REHM.